Aug. 5, 1930.   N. S. NELSON   1,772,107

TIRE POP VALVE

Filed April 15, 1926

Inventor
Nels S. Nelson
By Irving Harness
Attorney

Patented Aug. 5, 1930

1,772,107

UNITED STATES PATENT OFFICE

NELS S. NELSON, OF PONTIAC, MICHIGAN, ASSIGNOR, BY MESNE ASSIGNMENTS, TO SAFETY TIRE POP-VALVE COMPANY, A CORPORATION OF MICHIGAN

TIRE POP VALVE

Application filed April 15, 1926. Serial No. 102,127.

It is the primary object of my invention to provide a device which is adapted to be secured to the valve stems of conventional automobile tires for the purpose of preventing the introduction of an excessive amount of air into the tires, and to so construct the device that it may be cheaply manufactured, will be composed of a small number of parts, and will operate efficiently.

With the above and other objects in view my invention consists in the arrangement, combination and construction of the various parts of my improved device as described in the specification, claimed in my claims and shown in the accompanying drawing, in which:

Figure 1:
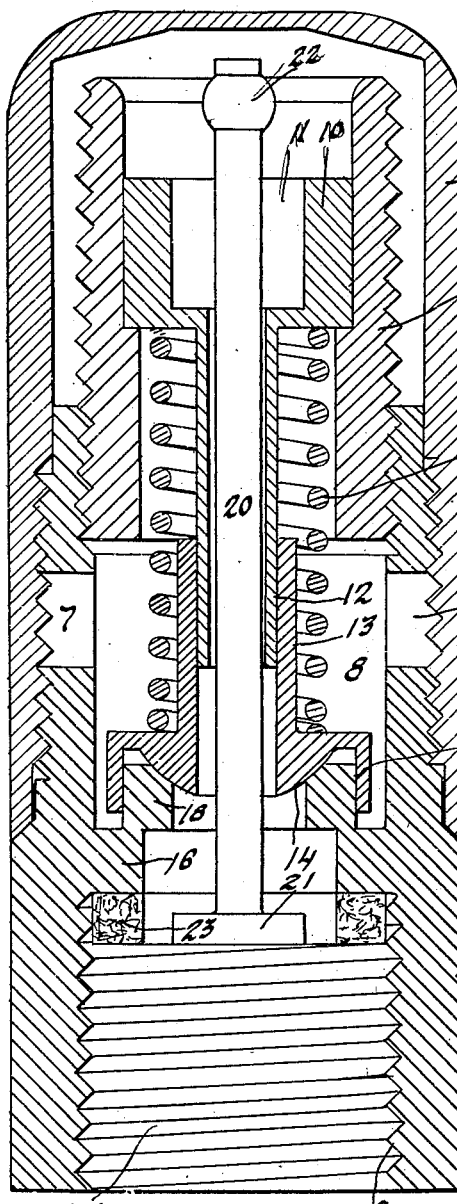
Fig. 1 is a central sectional view of my improved device, showing the dust cap thereon, and the valve in its normal seated position.

I have shown a tubular fitting 5, which is provided with a screw-threaded opening 6 adapted to be screwed upon the valve stem (not shown) of an automobile tire. The fitting 5 is provided with oppositely disposed openings 7 in the side thereof, communicating from the outside with the chamber 8 within the fitting.

Screwed in the top of the fitting 5 is a member 9 which is adapted to receive an insert 10 having a central opening 11 and a hollow extension 12 which terminates within the chamber 8. Encompassing the end of the extension 12 is a tubular member 13 which is provided on its lower end with a curved ball-like construction 14 adapted to seat in the portion 15 of the cross web 16 which is provided at the bottom of the chamber 8. A circular flange 17 is provided, extending from the portion 14 and engaging the outside of the projection 18 in which the seat 15 is located. A coil spring 19 is provided around the tubular sleeves 12 and 13 bearing at its top against the bottom of the insert 10, and at its bottom against the top of the portion 14 so as to normally force the portion 14 against the seat 15.

A core 20 is extended from adjacent the top of the member 9 through the opening 11, and the tubular extension 12, to a point adjacent the bottom of the fitting 5. The core is provided with a head 21 on its bottom, which is adapted to contact with the core within the valve stem of the tire, and a head 22 which is adapted to prevent the core 20 from slipping out of the tubular extension 12 when the device is not assembled to a valve stem.

A rubber gasket 23 is provided within the fitting 5 against which the end of the valve stem tubing may seat when the device is placed on the stem, and a cap 24 is screwed on the fitting 5 so as to cover the opening in the member 9 as well as the side opening 7 in the fitting 5, and prevents the escape of air by slow leak when the device is left on an automobile tire during the operation thereof.

Figure 2:
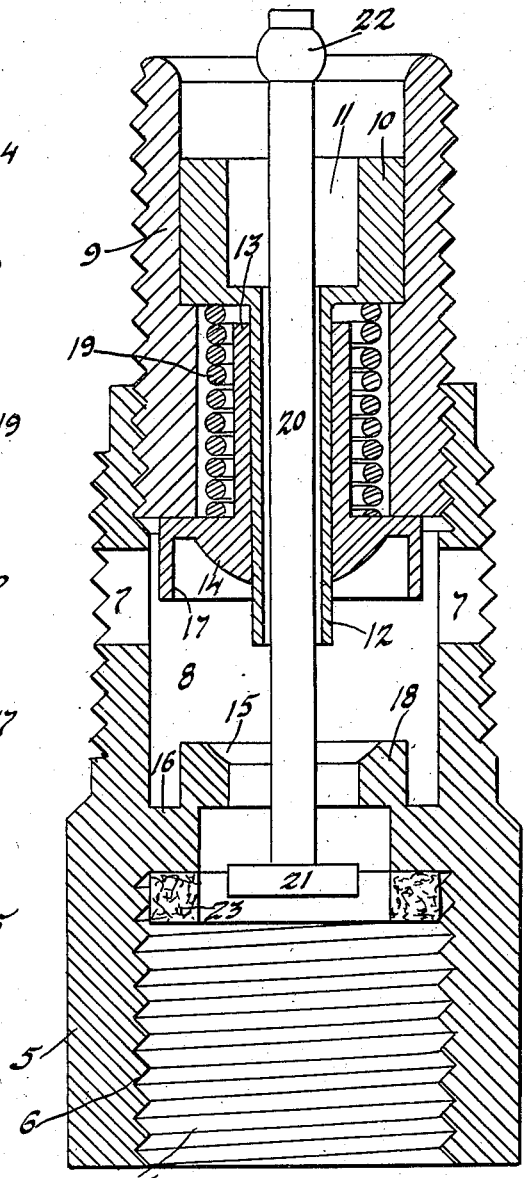
Fig. 2 is a similar view, showing the dust cap removed and the valve in its unseated position.

In the practical operation of my device, after it has been screwed on the valve stem through the threads 6, the cap 24 is removed and an air hose applied to the free end of the member 9 with the result that the core 20 is depressed, and air will enter through the passage 11, and around the core 20, through the tubular extension 12 into the chamber 25 in the bottom of the fitting 5, thence into the tire. When a predetermined pressure in the tire has been obtained (such pressure being fixed by the strength of the coil spring 19) the back pressure from the chamber 25 will react upon the curved portion or valve 14, to unseat it from the seat 15 and cause it to rise to the position shown in Fig. 2. This will permit the escape of air from the chamber 25 into the chamber 8, and from there to the atmosphere through the openings 7. As soon as the air hose is removed from the fitting so that additional air is not being passed into the tire, it will, of course, be apparent that the spring 19 will force the valve 14 back into engagement with its seat so that further escape of air from the tire will be prevented. The cap 24 may then be again assembled on the fitting 5 so as to prevent slow leak of air through the passages 7 or 11 in normal usage.

It will be obvious that various changes may be made in the arrangement, combination and construction of the various parts of my improved device, without departing from the spirit of my invention, and it is my invention to cover by my claims such changes as may be reasonably included within the scope thereof.

What I claim is:

1. A tire pop valve comprising a casing having a passage through which air may pass to the tire, a valve and valve seat communicating with said passage and adapted to receive back pressure built up therein, said valve having a portion extending beyond the opening of the valve seat to the passage and forming a closed pocket to receive air when the valve is initially lifted.

2. A tire pop valve comprising a tubular casing, a fixed cross wall in said casing having an upwardly extending cylindrical portion, said cross wall being provided with an opening through the same formed to provide a spherical seat at the upper edge of said cylindrical portion, a valve engageable with said seat provided with a downwardly extending skirt spaced outwardly of said seat and slidably engaging the exterior surface of said cylindrical portion, and a spring urging said valve towards seated position.

3. A tire pop valve comprising a tubular casing, a fixed cross wall in said casing having an upwardly extending cylindrical portion, said cross wall being provided with an opening through the same formed to provide a spherical seat at the upper edge of said cylindrical portion, a valve engageable with said seat provided with a downwardly extending skirt spaced outwardly of said seat and slidably engaging the exterior surface of said cylindrical portion, and a spring urging said valve towards seated position, said skirt being of sufficient depth to prevent a substantial escape of air through said wall upwardly until said valve has been lifted a material distance from said seat.

4. A tire pop valve comprising a tubular casing, a fixed cross wall in said casing provided with a reduced cylindrical extension, said cross wall being provided with a centrally disposed opening therethrough terminating at the end of said extension in a valve seat, a valve member formed to provide a valve portion cooperating with said seat to normally prevent the passage of air through said wall and an enlarged portion provided with a peripheral skirt telescopically engaging the exterior of said cylindrical portion, and a spring urging said valve portion towards said seat, said skirt preventing a material passage of air through said wall upon an initial opening movement of said valve member and causing the pressure of air escaping past said seat upon said initial movement to positively act on the area of said valve member within said skirt and thereby effect a positive added lifting force on said valve to effect a complete opening of the same.

NELS S. NELSON.